(12) United States Patent
Stauffer

(10) Patent No.: US 6,689,263 B1
(45) Date of Patent: Feb. 10, 2004

(54) DIMENSIONALLY STABLE ELECTRODES

(76) Inventor: John E. Stauffer, 6 Pecksland Rd., Greenwich, CT (US) 06831

( * ) Notice: Subject to any disclaimer, the term of this patent is extended or adjusted under 35 U.S.C. 154(b) by 0 days.

(21) Appl. No.: 10/425,889

(22) Filed: Apr. 28, 2003

(51) Int. Cl.$^7$ ................................................ C25B 11/04
(52) U.S. Cl. ........................ 204/291; 204/280; 204/242; 204/268; 204/275.1
(58) Field of Search ................................. 204/242, 268, 204/275.1, 280, 291; 205/554

(56) References Cited

U.S. PATENT DOCUMENTS

| | | | | |
|---|---|---|---|---|
| 4,830,718 A | * | 5/1989 | Stauffer | 205/554 |
| 5,344,529 A | * | 9/1994 | Stauffer | 205/554 |
| 5,512,144 A | * | 4/1996 | Stauffer | 205/554 |
| 5,705,050 A | * | 1/1998 | Sampson et al. | 205/687 |
| 6,010,604 A | * | 1/2000 | Stauffer | 204/242 |
| 6,235,167 B1 | * | 5/2001 | Stauffer | 204/274 |
| 6,391,186 B1 | | 5/2002 | Stauffer | |

* cited by examiner

*Primary Examiner*—Bruce F. Bell
(74) *Attorney, Agent, or Firm*—Young & Basile P.C.

(57) ABSTRACT

Dimensionally stable electrodes are fabricated from nitrides of metals in the groups IV B and V B. These electrodes are in the form of particulates for use in bipolar cells. The particulates of these nitrides, which are electrically conductive, are intimately mixed with non-conductive particulates and spaced between two electrical leads. Such bipolar cells have application in metal recover processes and water purification.

7 Claims, 1 Drawing Sheet

DIMENSIONALLY STABLE ELECTRODES

FIELD OF THE INVENTION

Dimensionally stable electrodes are comprised of particulates fabricated from nitrides of metals selected from the IV B and V B groups. These electrodes are designed for use in bipolar electrolytic cells. Bipolar cells are used to remove ions from solution in such applications as metal recover processes and water purification.

BACKGROUND OF THE INVENTION

Bipolar electrolytic cells have been used for many years in electrochemical processes. In these cells particles of an electrically-conductive material act as both anodes and cathodes. In this manner, the electrical resistance of the cell is reduced and overall efficiency is improved.

A significant advancement in bipolar cells was disclosed in U.S. Pat. No. 6,391,186 issued May 21, 2002. The unique feature of this improvement is the use of an intimate mixture of electrically conductive and non-conductive particles spaced between two electrical leads. The conductive particles form clumps or strands that act as bipolar electrodes.

Notwithstanding the advantages of the improved bipolar cell, practical considerations limit its use. All of the materials so far considered for use in the electrically-conductive particles have drawbacks. Carbonaceous substances including graphite are attacked in many applications. Platinum, even when employed for plating a substrate, is expensive. And lead, also mentioned in the literature, has the decided disadvantage of being toxic.

Therefore, it is an object of the present invention to provide bipolar electrodes that have none of the disadvantages of those proposed in the prior art. These goals and other objects, features and advantages of the invention will be apparent from the accompanying drawing and the following description.

SUMMARY OF THE INVENTION

The present invention discloses dimensionally stable electrodes for use in bipolar electrolytic cells. These dimensionally stable electrodes are comprised of particulates fabricated from nitrides of metals selected from the groups IV B and V B. These particulates, which are electrically conductive, are intimately mixed with non-conductive particulates, and the mixture is spaced between two electrical leads to provide a bipolar cell.

The metallic nitrides formed from metals of groups IV B and V B include titanium nitride, zirconium nitride, hafnium nitride, vanadium nitride, niobium nitride and tantalum nitride. These nitrides may be used in their pure form or as complexes of two or more nitrides. Because of the refractory nature of the metallic nitrides, shapes of these materials commonly are formed by hot pressing or pressure sintering of the powdered substance. The metallic nitride, however, need not be used in a monolithic particulate, but it can be applied as a coating to a substrate.

DETAILED DESCRIPTION OF THE PREFERRED EMBODIMENT

Figure 1:
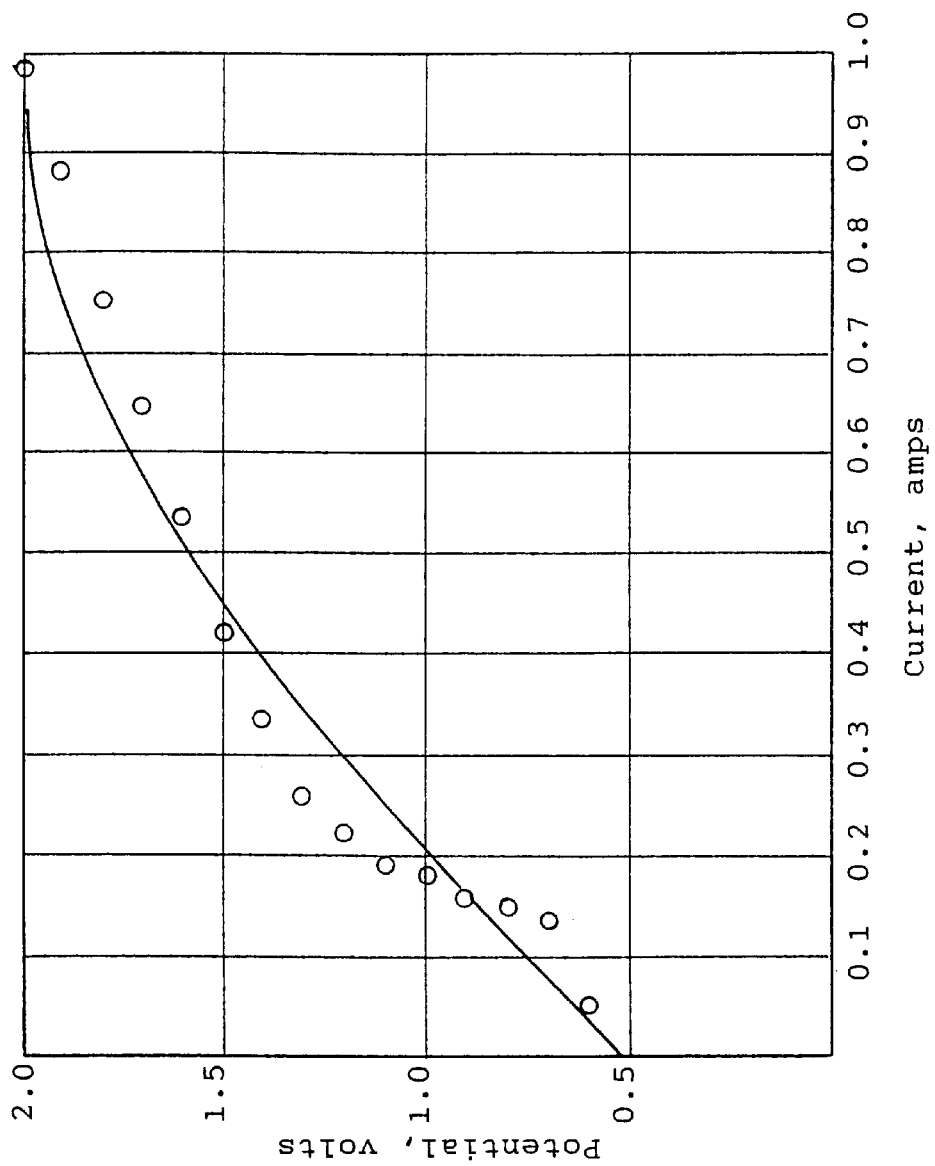
FIG. 1 shows the results of an experiment using titanium nitride electrodes. The potential across the electrolytic cell is shown as a function of the current when sulfurous acid was electrolyzed to sulfuric acid.

The dimensionally stable electrodes of the present invention are fabricated from nitrides of metals of groups IV B and V B. Included in the group IV B metal nitrides are titanium nitride (TiN), zirconium nitride (ZrN), and hafnium nitride (HfN). The group V B metal nitrides include vanadium nitride (VN), niobium nitride (NbN) and tantalum nitride (TaN).

The metal nitride of interest is fabricated into particulates of suitable size and shape. Two considerations are important in determining these parameters. First, there should be a minimum restriction to the flow of a solution through the electrolytic cell. Second, it is desirable to achieve a maximum electrode surface. These two requirements are contradictory so that a compromise must be reached in determining the size of the particulates. The range of mesh sizes to be considered varies from 4 (4.76 mm) to 12 (1.68 mm) U.S. Sieve Series. Although a spherical shape is favored, practical matters may dictate the use of uneven fragments.

The metallic nitrides of interest have several critical characteristics.

First, they are good electrical conductors. The electrical resistivity in $\mu\Omega\cdot$cm is 25 for TiN, 21 for ZrN, 33 for HfN, 85 for VN, 78 for NbN, and 128 for TaN.

In addition, these materials are corrosion resistant, having properties similar to other ceramics. In this respect they belie their metallic nature. As is the case with many ceramics, these metallic nitrides possess high hardness and elevated melting points. Specifically, the melting point of TiN is 2950° C., ZrN is 2980° C., HfN is 3330° C., and VN is 2350° C. NbN decomposes at 2630° C., and TaN decomposes at 2950° C.

The costs of the metallic nitrides are relatively high because of their limited supply, but the materials have the potential of coming down dramatically in price. Especially titanium and vanadium occur widely in nature and are used extensively in commerce. As fabricating methods improve, electrodes made from the metallic nitrides should become more affordable.

The particulates used as dimensionally stable electrodes are intimately mixed with non-conductive particulates, and the mixture so formed is spaced between electrical leads to provide a bipolar cell. The mixture of particulates has a random composition so that clumps or strands of the metallic nitride particulates are formed. These clusters of electrically-conducting particulates function as bipolar electrodes. For this reason the service is more demanding. Any suitable electrode material must be capable of functioning both as an anode and a cathode.

A final consideration is the electrical potential necessary to operate a cell. This value usually exceeds the theoretical minimum because of the required overvoltage. That overvoltage will depend on the nature of the electrode used.

EXAMPLE 1

Two titanium nitride electrodes, 99.5% pure, were fabricated by hot pressing powder into plates with the dimensions 2 in.×3 in.×0.25 in. By accident, one of the electrodes was broken down the middle so that its effective area was reduced by a half These electrodes were placed in a glass jar 2.5 in. in diameter and 2.5 in. high. The jar was filled with 25% sulfuric acid, and sulfur dioxide was sparged into the electrolyte. Data were collected by reading the electrical current as a function of the applied voltage. These results are plotted in FIG. 1. Of particular interest is the fact that the current started flowing at a potential slightly above 0.5 volts, which is considered acceptable. At the end of the run, the electrodes were examined, and no evidence of corrosion was noticed.

EXAMPLE 2

Zirconium nitride electrodes were fabricated by hot pressing powder of 99+% pure ZrN excluding hafnium. These electrodes, with dimensions of 3 in.×1 in.×0.25 in., were placed in a glass jar, as in Example 1, which was filled with 25% sulfuric acid. Sulfur dioxide was sparged into the acid. Readings of the current were recorded as the applied potential was increased. At 1.1 volts the current was 0.01 amps and at 1.7 volts the current was 0.06 amps. These results were notably inferior to those obtained with titanium nitride electrodes. The data suggested vanadium nitride as an alternative. Vanadium is less metallic than zirconium and bears chemical properties similar to titanium.

What is claimed is:

1. A dimensionally stable electrode comprising electrically conductive particulates fabricated from the nitride of a metal selected from the IV B and V B groups, said conductive particulates being intimately mixed with non-conductive particulates and spaced between two electrical leads so as to provide a bipolar electrolytic cell for removing ions from solution.

2. An electrode according to claim 1 wherein the electrode is fabricated from titanium nitride.

3. An electrode according to claim 1 wherein the electrode is fabricated from zirconium nitride.

4. An electrode according to claim 1 wherein the electrode is fabricated from hafnium nitride.

5. An electrode according to claim 1 where the electrode is fabricated from vanadium nitride.

6. An electrode according to claim 1 wherein the electrode is fabricated from niobium nitride.

7. An electrode according to claim 1 wherein the electrode is fabricated from tantalum nitride.

* * * * *